(12) United States Patent
Takase et al.

(10) Patent No.: US 9,397,327 B2
(45) Date of Patent: Jul. 19, 2016

(54) BATTERY CONNECTING ASSEMBLY

(75) Inventors: Shinichi Takase, Yokkaichi (JP); Hiroki Hirai, Yokkaichi (JP); Masakuni Kasugai, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 484 days.

(21) Appl. No.: 13/581,571

(22) PCT Filed: Mar. 1, 2011

(86) PCT No.: PCT/JP2011/054567
§ 371 (c)(1),
(2), (4) Date: Aug. 28, 2012

(87) PCT Pub. No.: WO2011/108511
PCT Pub. Date: Sep. 9, 2011

(65) Prior Publication Data
US 2012/0322320 A1     Dec. 20, 2012

(30) Foreign Application Priority Data
Mar. 2, 2010 (JP) .................................. 2010-045663

(51) Int. Cl.
*H01R 13/62* (2006.01)
*H01M 2/20* (2006.01)
(Continued)

(52) U.S. Cl.
CPC ............ *H01M 2/206* (2013.01); *H01M 2/1077* (2013.01); *H01R 11/288* (2013.01)

(58) Field of Classification Search
CPC ... H01M 2/1077; H01M 2/206; H01R 11/288
USPC .................................................. 439/627, 366
See application file for complete search history.

(56) References Cited

U.S. PATENT DOCUMENTS 1,460,604 A * 7/1923 Potter ........................... 439/627
5,800,942 A * 9/1998 Hamada et al. ............... 429/175
(Continued)

FOREIGN PATENT DOCUMENTS

JP     A-11-67184     3/1999
JP     A-2001-57196   2/2001
(Continued)

OTHER PUBLICATIONS

International Search Report issued in International Patent Application No. PCT/JP2011/054567 dated Jun. 14, 2011.
Written Opinion issued in International Patent Application No. PCT/JP2011/054567 dated Jun. 14, 2011 (with translation).
Jan. 8, 2015 European Search Report issued in European Patent Application No. 11750621.2.

*Primary Examiner* — Felix O Figueroa
(74) *Attorney, Agent, or Firm* — Oliff PLC

(57) ABSTRACT

A battery connecting assembly 20 includes a first coupling unit 21 having a plurality of individual units 20A each accommodating a connecting member 13, and configured by coupling the individual units 20A adjacent to each other; a second coupling unit 22 having a plurality of individual units 20A each accommodating a connecting member 13, and configured by coupling the individual units 20A adjacent to each other, and arranged side by side with the first coupling unit 21; and a positioning member 40 connected to the first coupling unit 21 and the second coupling unit 22 to position the first coupling unit 21 and the second coupling unit 22 relatively.

7 Claims, 22 Drawing Sheets

(51) Int. Cl.
*H01R 11/28* (2006.01)
*H01M 2/10* (2006.01)

(56) References Cited

U.S. PATENT DOCUMENTS

| | | | |
|---|---|---|---|
| 6,275,003 | B1 | 8/2001 | Marukawa et al. |
| 6,935,020 | B2 * | 8/2005 | Ikeda ............................ 439/627 |
| 8,426,056 | B2 * | 4/2013 | Ikeda et al. .................. 429/158 |
| 2007/0009790 | A1 | 1/2007 | Vutetakis et al. |
| 2012/0009447 | A1 | 1/2012 | Ikeda et al. |

FOREIGN PATENT DOCUMENTS

| | | |
|---|---|---|
| JP | 2007/280679 A | 10/2007 |
| JP | A-2010-225449 | 10/2010 |
| JP | A-2011-8957 | 1/2011 |
| JP | A-2011-77031 | 4/2011 |
| WO | WO 2009/022521 A1 | 2/2009 |

* cited by examiner

BATTERY CONNECTING ASSEMBLY

TECHNICAL FIELD

The present invention relates to a battery connecting assembly.

BACKGROUND ART

In a battery module for electric cars or hybrid cars, electric cells having positive and negative electrode terminals are arranged in line. The electrode terminals of electric cells that are adjacent to each other are connected through a connecting member (bus bar) to connect a plurality of electric cells in series or parallel (See Patent Document 1).

Patent Document 1: Japanese Unexamined Patent Publication No. 11-067184

In the above configuration, as it is required to connect electrode terminals through a connecting member, it is required to attach a connecting member between each pair of electrode terminals, which is troublesome work. Therefore, it is conceivable to form a battery connection plate, in which a plurality of connecting members is integrally molded in resin, and to attach this battery connection plate to electric cells arranged in line to mount a plurality of connecting members at once.

However, in a case of using the battery connection plate where the plurality of connecting members is integrally molded, the number of the electric cells increases. Therefore, as the size of a mold forming the battery connection plate becomes larger, this increases the cost. In addition, there has been a problem that, when the number of electric cells is changed, it is required to prepare another new mold having a length corresponding to the number of electric cells, and to form a battery connection plate having a different length, resulting in increasing the cost for forming the mold and the like, which then increases manufacturing costs.

Therefore, the inventors of the present invention have come to conceive a battery connecting assembly having resin units corresponding to the number of connecting members, and connecting these units to each other to attach a plurality of electric cells thereto, instead of a battery connection plate where a plurality of connecting members are integrally molded.

Positive and negative electrode terminals project from electric cells. Therefore, arranging the plurality of electric cells side by side makes the electrode terminals arranged in multiple lines. To connect the plurality of batteries in series or parallel, the electrode terminals arranged in the plurality of lines may need to be connected by each line. A specific description will be made as follows. In a case that a plurality of electric cells is connected in series or parallel, electrode terminals of every two adjacent electric cells are connected through a connecting member in one line. On the other hand, in the other line, electrode terminals of every two adjacent electric cells are connected through a connecting member in a manner that the two adjacent electric cells of the other line are displaced by one electric cell with respect to the two adjacent connected electric cells of the one line.

Accordingly, at the time that electric cell connection assemblies each having a plurality of connecting members are installed line by line, the battery connecting assembly of one line must be installed in a place displaced from the battery connecting assembly of the other line by one electric cell. After the battery connecting assembly is connected to one line, if the installation position of the other battery connecting assembly to the other line is made wrongly, it is concerned that not only the electric cells cannot be connected in series or the like, but also the electric cells may be short-circuited.

Therefore, there is a need in the art to provide a battery connecting assembly configured to prevent an error in the installation position, and the like.

A battery connecting assembly accommodating a plurality of connecting members connecting electrode terminals adjacent to each other in an electrode terminal group of each line in a battery module, in which a plurality of electric cells each having a positive electrode terminal and a negative electrode terminal is aligned to form the plurality of electrode terminal groups of the plurality of lines, including: a first coupling unit having a plurality of individual units each accommodating the connecting member, and configured by coupling the individual units adjacent to each other; a second coupling unit having a plurality of individual units each accommodating the connecting member, and configured by coupling the individual units adjacent to each other, and arranged side by side with the first coupling unit; and a positioning member connected to the first coupling unit and the second coupling unit to position the first coupling unit and the second coupling unit relatively.

According to the above configuration, the battery connecting assembly prevents a short circuit and the like due to, for example, a wrong assembly position of the second coupling unit with respect to the first coupling unit because the positions of the first coupling unit and the second coupling unit are defined by the positioning member.

According to the present invention, a wrong installation position of a battery connecting assembly is prevented.

EXPLANATION OF SYMBOLS

Figure 1:
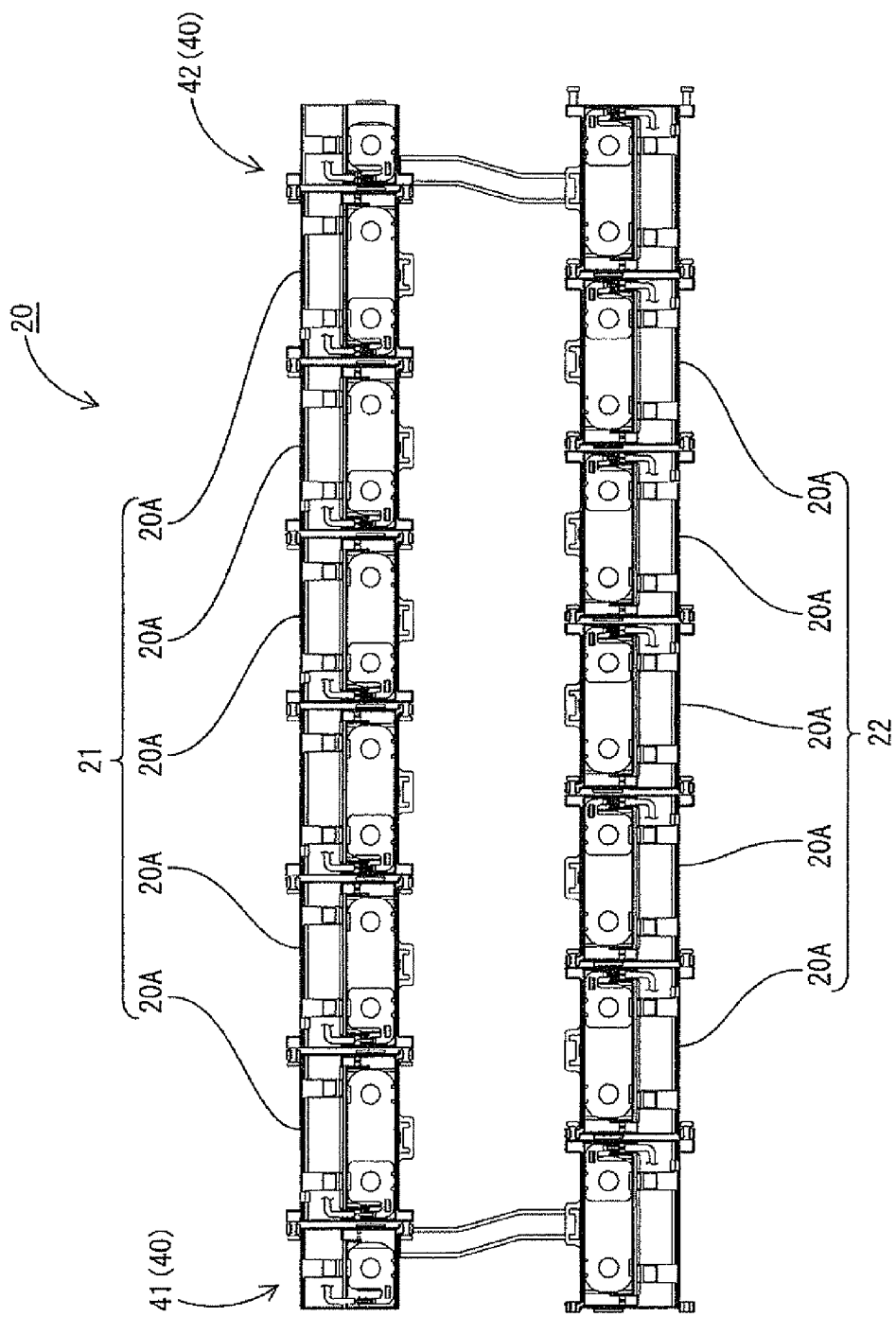
FIG. 1 is a plan view of a battery connecting assembly according to a first embodiment.
Figure 2:
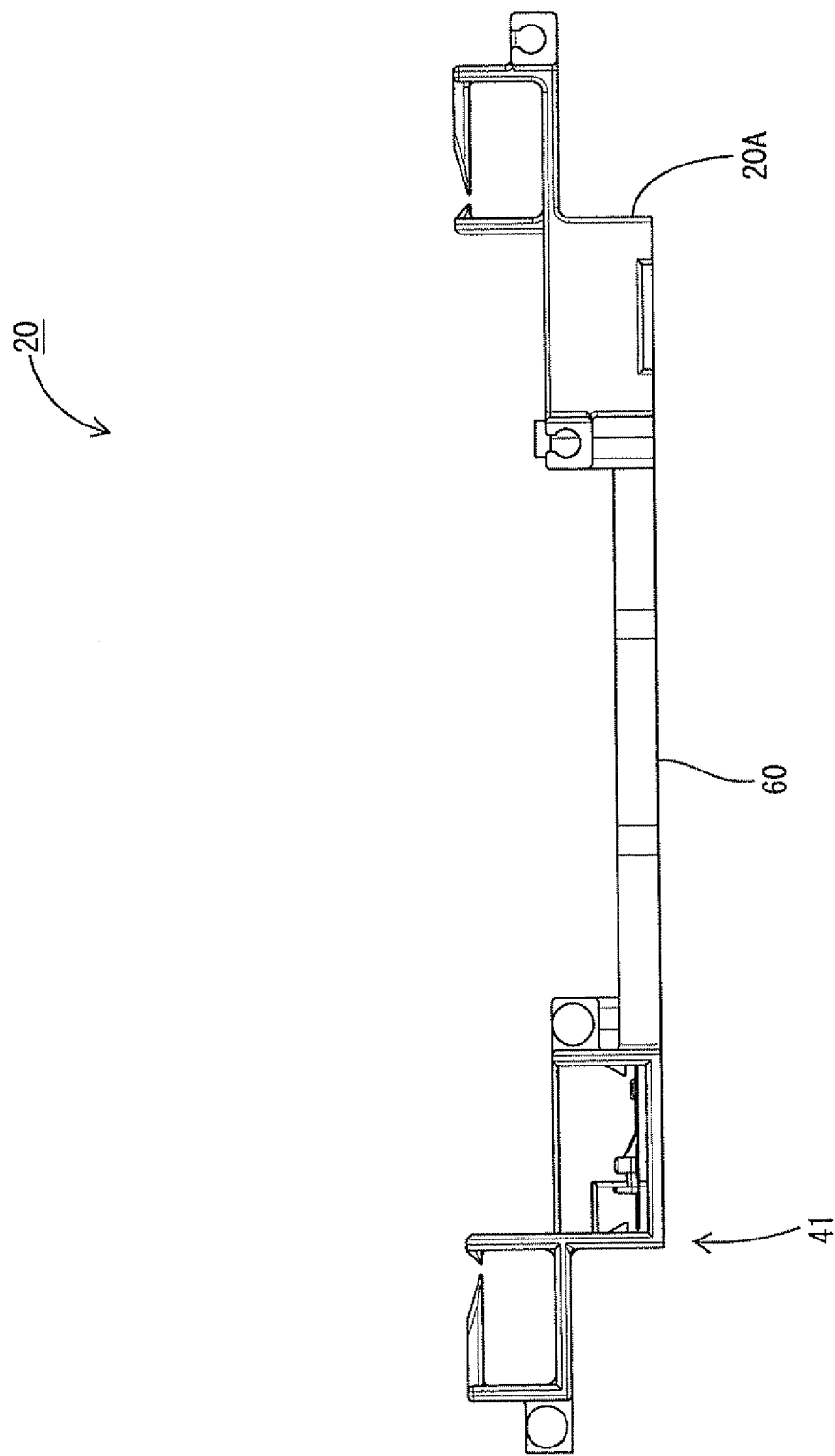
FIG. 2 is a left side view of the battery connecting assembly.
Figure 3:
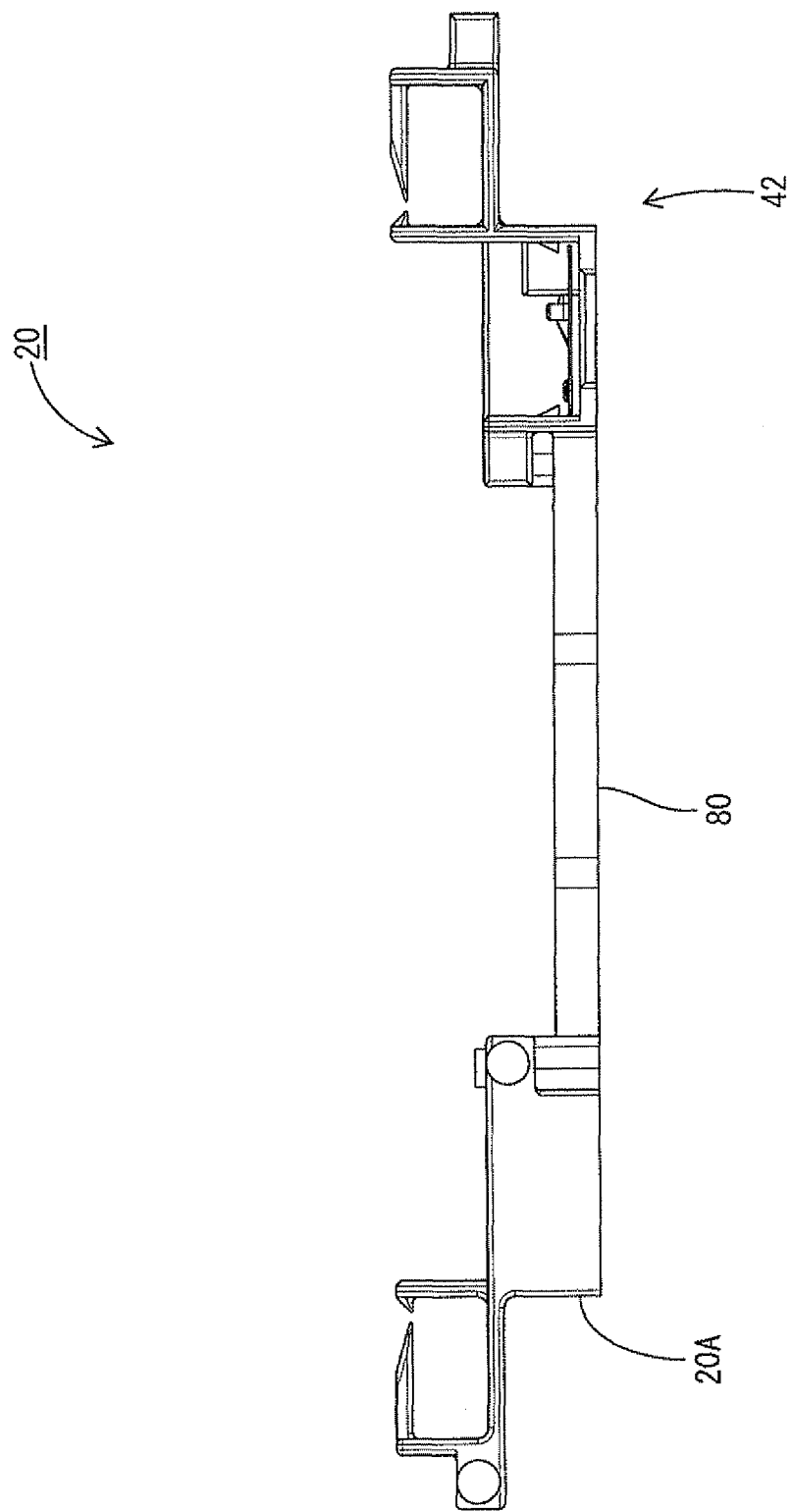
FIG. 3 is a right side view of the battery connecting assembly.

10: Electric cell
12A: Positive electrode terminal (Electrode terminal)
12B: Negative electrode terminal (Electrode terminal)
13: Connecting member
20: Battery connecting assembly
20A: Individual unit
21, 87: First coupling unit
22, 88: Second coupling unit
25, 43, 71: Accommodating portion
26: Body portion
30, 47, 72: Ditch portion
40, 90: Positioning member
41: First divided member
41A, 70: Divided body portion
42: Second divided member
50: Coupling portion
51: Engaging portion
52: Engaged portion
55: Locked portion
56: Locking hole
60, 80: Extended locking portion
61, 81, 95: Extended body portion
65, 85: Locking projection part
91: First locking portion
92: Second locking portion
M: Battery module
W: Voltage detecting line

BEST MODE FOR CARRYING OUT THE INVENTION

First Embodiment

Figure 17:
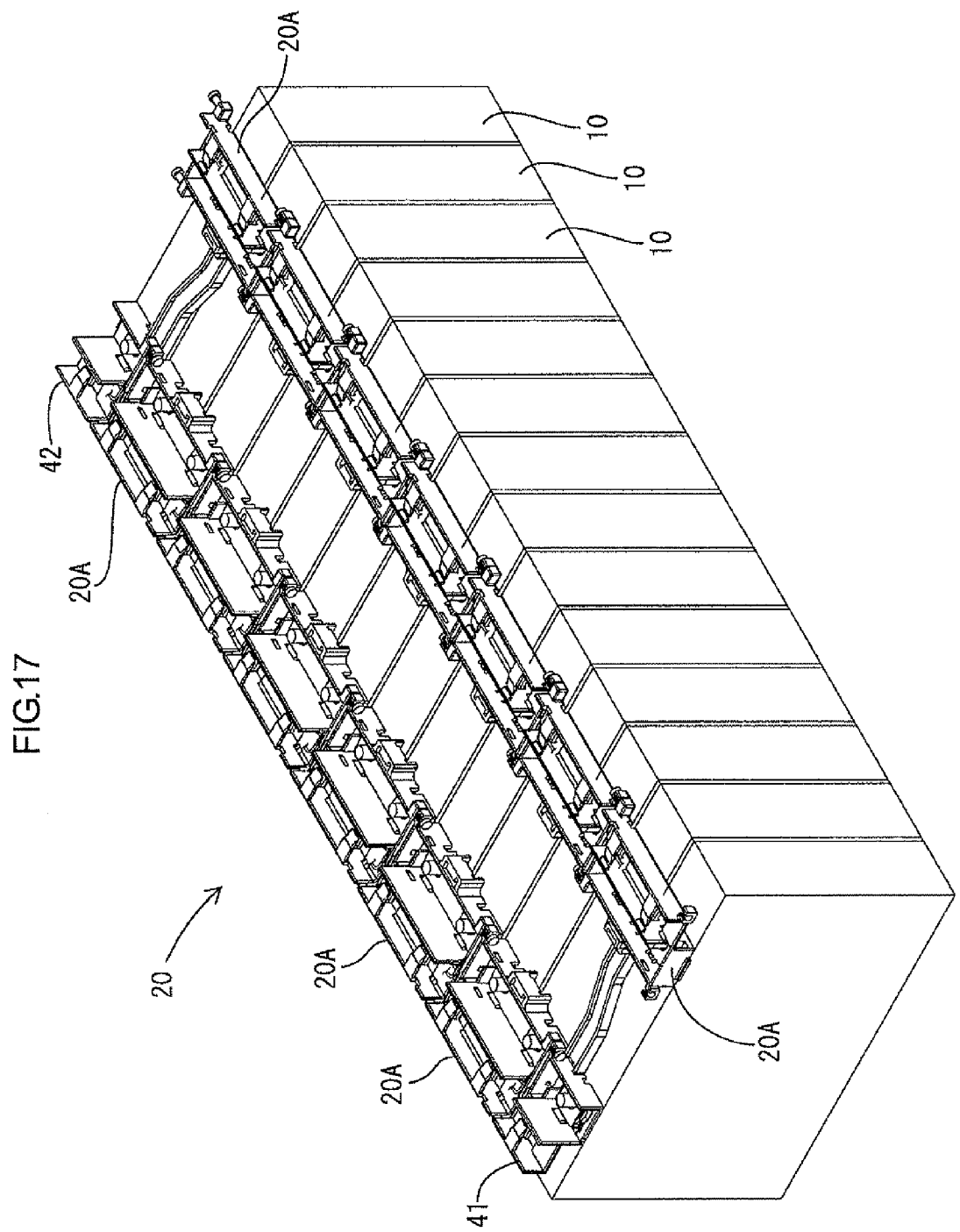
FIG. 17 illustrates a state where the battery connecting assembly is attached to a plurality of electric cells.
Figure 18:
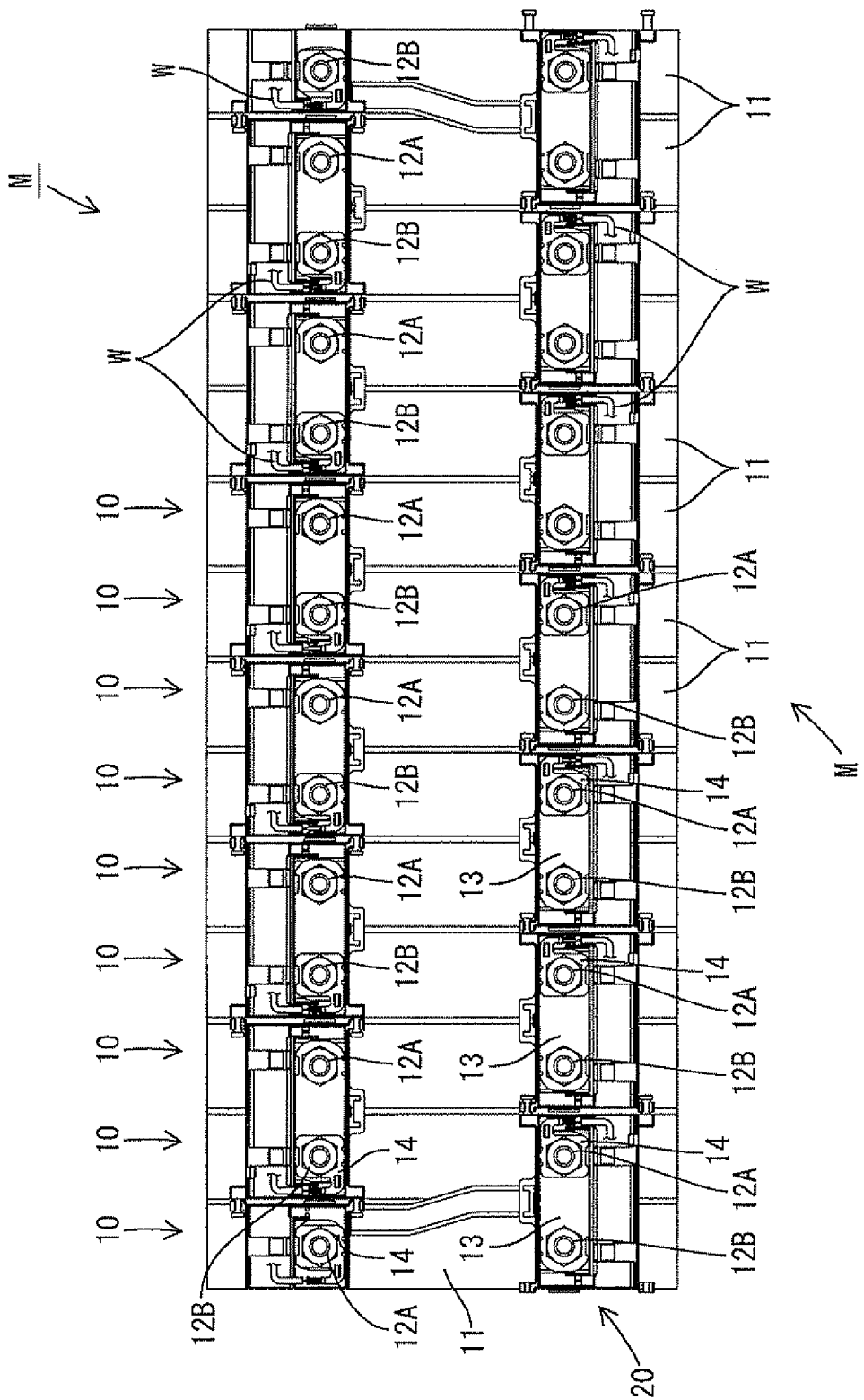
FIG. 18 is a plan view of a battery module.

A first embodiment of the present invention will be described with reference to FIGS. 1 to 18. As shown in FIG. 18, a battery connecting assembly 20 of this embodiment connects a plurality of electric cells 10 in a battery module M having a group of electric cells, in which the plurality of electric cells 10 each having positive and negative electrode terminals 12A and 12B are aligned. The battery module M having this battery connecting assembly 20 is used for, for example, a driving source of an electric car, hybrid car or the like. Hereinafter, the description is made based on a rule that the right and left direction (width direction) refers to FIG. 18, and the front side and the rear side refer to the upper side and the lower side of FIG. 18, respectively.

The battery module M includes: the plurality of electric cells 10; a voltage detecting line W detecting the voltage of the electric cells 10; and the battery connecting assembly 20 accommodating a plurality of connecting members 13 connecting adjacent electrode terminals 12A and 12B. Each electric cell 10 has: an electric cell body 11 accommodating an electric power generation element (not shown); and electrode terminals 12A and 12B having a bolt shape vertically projecting from the top surface of the electric cell body 11 (the positive electrode is indicated as 12A and the negative electrode is indicated as 12B).

The electrode terminals 12A and 12B are provided on the front side and rear side of the top surface of each electric cell body 11 with the polarities opposite to each other.

In addition, the electric cells 10 are arranged such that the orientation of each electric cell 10 is opposite to that of an electric cell 10 adjacent thereto so as to have a configuration where the electrode terminals 12A and 12B are arranged adjacent to each other. The plurality of electric cells 10 is fixed by a retaining plate. The voltage detecting line W is a cable, in which the core is covered with an insulation layer, and this insulation layer is stripped at the terminal to expose the core. The cable is then connected to a battery ECU (not shown). This battery ECU has a microcomputer, elements and the like, and has a known configuration having functions of detecting the voltage, current, temperature and the like of the electric cells 10, of conducting charge and discharge control of each electric cell 10, and the like.

As shown in FIG. 1, the battery connecting assembly 20 includes: a first coupling unit 21, in which a plurality of individual units 20A is placed (coupled to each other) in one line in the right and left direction; a second coupling unit 22, in which a plurality of individual units 20A is placed (coupled to each other) in one line in the right and left direction, and placed parallel to the first coupling unit 21; and a positioning member 40 positioning the first coupling unit 21 and the second coupling unit 22 relatively.

Figure 4:
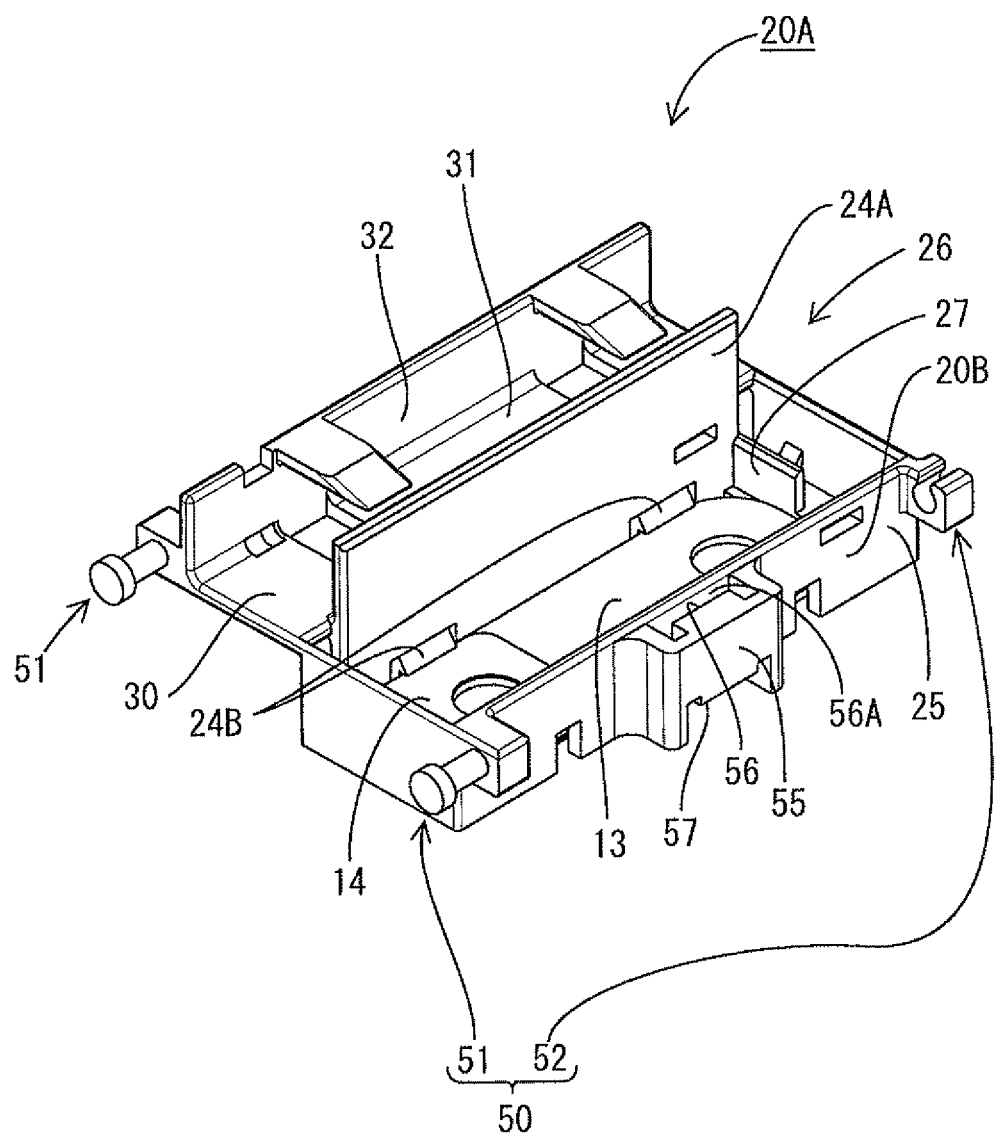
FIG. 4 is a perspective view of an individual unit.

Individual units 20A have an identical shape to one another. As shown in FIG. 4, each individual unit 20A includes: a metal connecting member 13 connecting adjacent electrode terminals 12A and 12B; and a resin body portion 26 accommodating the connecting member 13. In addition, each of the individual units 20A is mounted on the top surfaces of two (or predetermined number of) electric cells 10 adjacent to each other. The following descriptions will be made in a rule that the right and left direction of the individual unit 20A refers to FIG. 6, and the front side and the rear side refer to the upper side and the lower side of FIG. 6, respectively.

The connecting member 13 is made of metal such as copper, copper alloy and stainless steel (SUS), and has a substantially rectangular plate shape having terminal insertion holes through which the electrode terminals 12A and 12B are inserted. A plate-shaped terminal portion 14 is placed on one side of the connecting member 13 in the right and left direction. The terminal portion 14 is crimped to the terminal of the voltage detecting line W, and has a rectangular shape with a terminal insertion hole at the center.

The body portion 26 is made of synthetic resin such as PP. The body portion 26 includes: an accommodating portion 25 accommodating the connecting member 13; a ditch portion 30 extending to the front part of the accommodating portion 25, and having the voltage detecting line W routed therein; and a coupling portion 50 provided at four corners of the body portion and coupling to the body portion 26 of adjacent individual units 20A; and a locked portion 55 having a positioning member 40 (described later) to be locked at the rear end of the accommodating portion 25.

Figure 6:
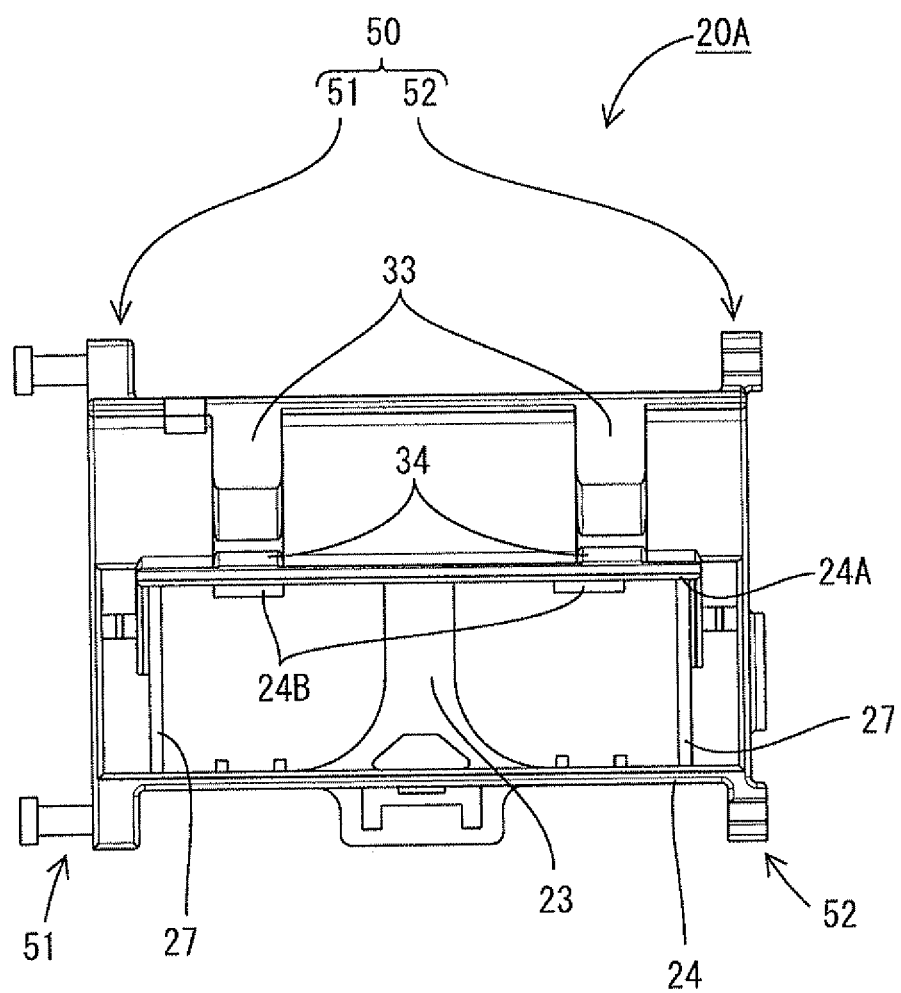
FIG. 6 is a plan view of the individual unit.

As shown in FIG. 6, the accommodating portion 25 has a bottom portion 23, on which the connection portion 13 is mounted, and a wall portion 24 rising from the edge of the bottom portion 23 so as to surround the connecting member 13. The bottom portion 23 has an opening formed substantially in its entirety, through which the electrode terminals 12A and 12B are inserted, and the bottom portion 23 connects the lower ends of the front and rear wall portions 24 at the middle portion in the width direction. The wall portion 24 prevents a short circuit due to contact of a tool and the like to the electrode terminals 12A and 12B or the connecting portion 13, and as shown in FIG. 4, the wall portion 24 in the front is a dividing wall portion 24A formed higher than others.

A pair of locking claws 24B projects from the proximal portion of the dividing wall portion 24A so as to increase their sizes toward the lower side in an inclined manner. When accommodating the connecting member 13, the connecting member 13 placed on the bottom portion 23 is locked at the upper side thereof by the pair of locking claws 24B. A pair of partition walls 27 is provided inside the right and left wall portions 24, and the connecting member 13 is accommodated inside these partition walls 27 while the voltage detecting line W is drawn to the ditch portion 30 through the space between a partition wall 27 and a wall portion 24.

Figure 5:
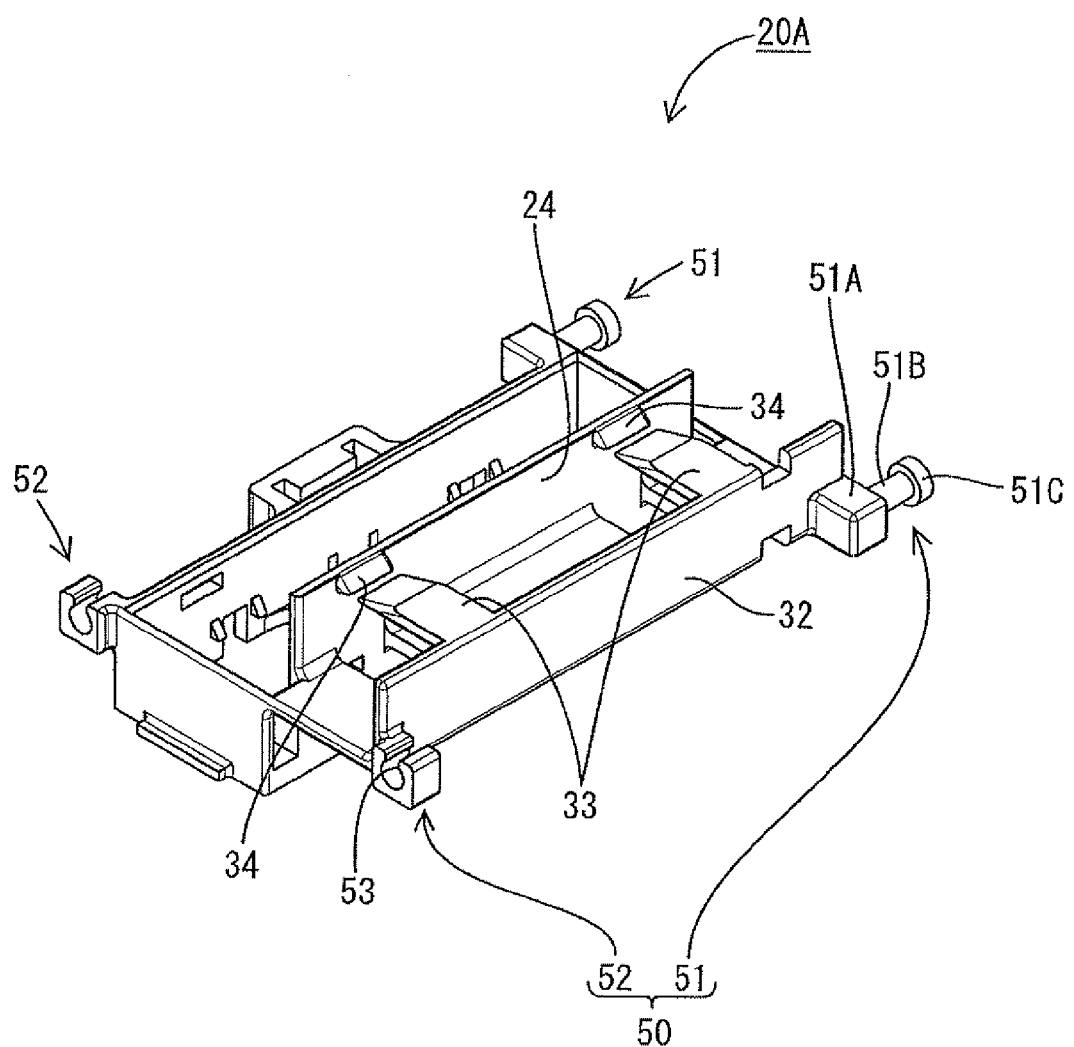
FIG. 5 is a perspective view of the individual unit as viewed from a rear perspective.

The ditch portion 30 is defined by: the dividing wall portion 24A; a base plate 31 extending to the front side of the dividing wall portion 24A at the height of the wall portion 24 other than the dividing wall portion 24A; and a side wall portion 32 rising from the front edge of the base plate 31. As shown in FIG. 5, an electric-wire retaining claw 33 projects from the top end of the side wall portion 32 toward the dividing wall portion 24A while a retaining projection portion 34 projects from the top end of the dividing wall portion 24A toward the side wall portion 32. A space for inserting the voltage detecting line W is formed between the electric-wire retaining claw 33 and the retaining projection portion 34, and the voltage detecting line W is inserted through this space to be retained within the ditch portion 30. When individual units 20A are coupled in the right and left direction, the ditch portions 30 of adjacent individual units 20A are arranged in line. Therefore, the voltage detecting line W connected to the battery ECU and the like is accommodated therein.

The coupling portion 50 has two engaging portion 51 provided at the left end side (one side in the aligned direction), and two engaged portion 52 provided at the right end side (the other side in the aligned direction of the individual units 20A) and engaged with the engaging portions 51 of an adjacent individual unit 20A.

Each engaging portion 51 includes: supporting proximal portions 51A projecting from the front end and the rear end in a rectangular parallelepiped shape; a shaft portion 51B cylindrically extending to the left (in the aligned direction) of the individual unit 20A from the supporting proximal 51A; and a flanged portion 51C having a disc shape and radially extending from the circumference of the shaft portion 51B at the end of the shaft portion 51B. On the other hand, each engaged portion 52 has an insertion recessed portion 53 projecting from the front end and the rear end in a rectangular parallelepiped shape. The insertion recessed portion 53 includes a shaft insertion hole having a substantially circular shape penetrating in the right and left direction, and a pair of engaging projection portions projecting inwardly at the upper part of the shaft insertion hole.

The shaft insertion hole has a diameter sufficient to insert the shaft portion 51B of the engaging portion 51, and the dimension between the pair of engaging projection portions 53B is slightly smaller than the diameter of the shaft portion 51B. In this manner, when the individual units 20A are coupled to each other, the shaft portion 51B of each engaging portion 51 is inserted between the pair of engaging projection portions of an insertion recessed portion 53, and the engaged portion 52 bends and deforms in a direction, in which the dimension between the pair of engaging projection portions slightly expands, and once the shaft portion 51B is inserted into the shaft insertion hole of the insertion recessed portion 53, the engaged portion 52 recovers the original shape, and the engaging portion 51 and the engaged portion 52 are engaged with each other. In this manner, in a state where the individual units 20A are coupled to each other, removal of the shaft portion 51B in the up and down direction is restricted by locking the shaft portion 51B to the pair of engaging projection portion 53B while the removal in the right and left direction is restricted by sandwiching the engaged portion 52 between the flanged portion 51C and the engaging surface.

As shown in FIG. 4, the locked portion 55 protrudes from the middle part of the rear of the body portion 26 in the right and left direction, and has a locking hole 56 penetrating in the upper and lower direction. The locking hole 56 opens with a substantially constant dimension other than both ends and has a U shape by cutting both ends toward the rear side. The hole wall 56A forming the front wall of the locking hole 56 is formed to be flush with the rear surface 20B of the individual unit 20A. The lower portion of the locked portion 55 has a fitting recessed portion 57 formed therein having a shape such that the positioning member matingly fits into the fitting recessed portion 57.

As shown in FIG. 1, the second coupling units 22 are arranged (coupled) in one line at a place corresponding to the locations of the electrode terminals 12A and 12B to be attached, and thereby the second coupling unit 22 is arranged spaced apart from the first coupling unit 21 by a certain distance in the front and rear direction. Also, the individual units 20A of the second coupling unit 22 are arranged such that the locations of the individual units 20A are displaced by the width dimension of one electric cell 10 in the right and left direction. In addition, the second coupling unit 22 does not have positioning members 40 at both ends, and the number of individual units 20A is larger than the number of individual units 20A of the first coupling unit 21. Each individual unit 20A of the second coupling unit 22 has the same configuration as the individual unit 20A of the first coupling unit 21.

Figure 7:
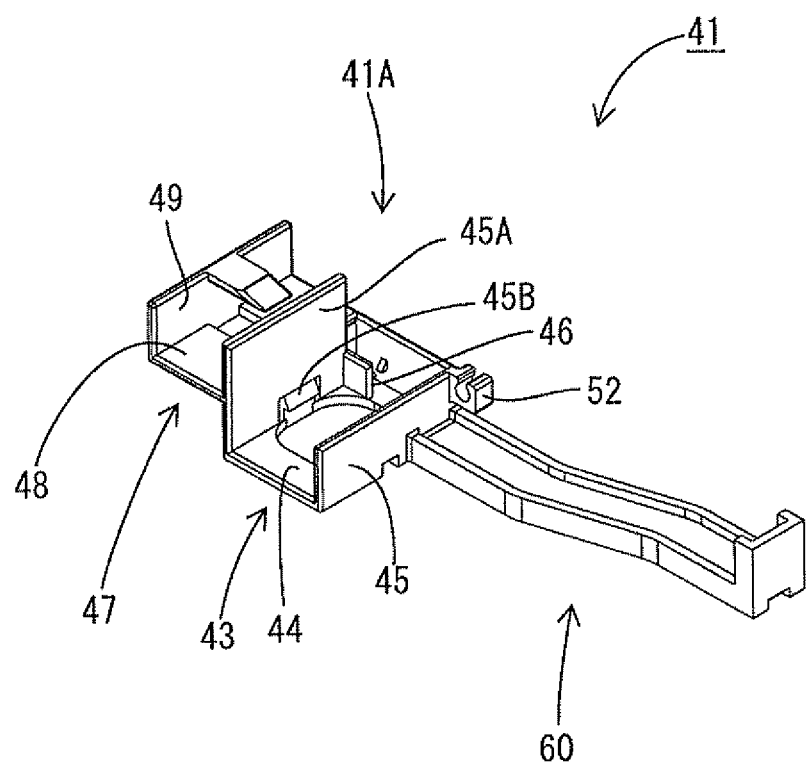
FIG. 7 is a perspective view of a positioning member coupled to the left end side of the coupling unit.

The positioning member 40 is made of synthetic resin such as PP, and includes a first divided member 41 coupled to the left end side (one side) of the first coupling unit 21, and a second divided member 42 coupled to the right end side (the other side) of the first coupling unit 21. As shown in FIG. 7, the first divided member 41 includes a dividing body portion 41A having a shape such that the individual unit 20A is divided by substantially half, and an extended locking portion 60 extending rearward from the divided body portion 41A in an arm shape and connected to the second coupling unit 22.

The divided body portion 41A has a divided shape such that the right half of the individual unit 20A remains while the left half is cut out. The divided body portion 41A includes: an accommodating portion 43 accommodating a terminal portion 14; a ditch portion 47, in which the voltage detecting line W is routed; and an engaged portion 52 coupling with the body portion 26 of an adjacent unit 20A. One divided body portion 41A is mounted on the upper surface of one electric cell 10.

The accommodating portion 43 has a bottom portion 44, and a wall portion 45 rising from the edge of the bottom portion 44 other than the left end side. The bottom portion 44 has an opening substantially in its entirety other than the edge, through which the electrode terminal 12A is inserted. The wall portion 45 at the front side is a dividing wall portion 45A formed higher than others.

A locking claw 45B protrudes from the proximal portion of the dividing wall portion 45A so as to increase their sizes toward the lower side in an inclined manner. When accommodating the connecting member 13, the top surface of the terminal portion 14 placed on the bottom portion 44 is locked by the locking claw 45B. A partition wall 46 is provided inside of the wall portion 45 of the right side, and the terminal portion 14 is accommodated at the left side of the partition wall 46 while the voltage detecting line W is routed at the right side of the partition wall 46. Since the positioning member 40 does not connect electrode terminals 12A and 12B (because only one electrode terminal 12A is inserted into the accommodating portion 43), it is not provided with any connecting member 13.

Figure 8:
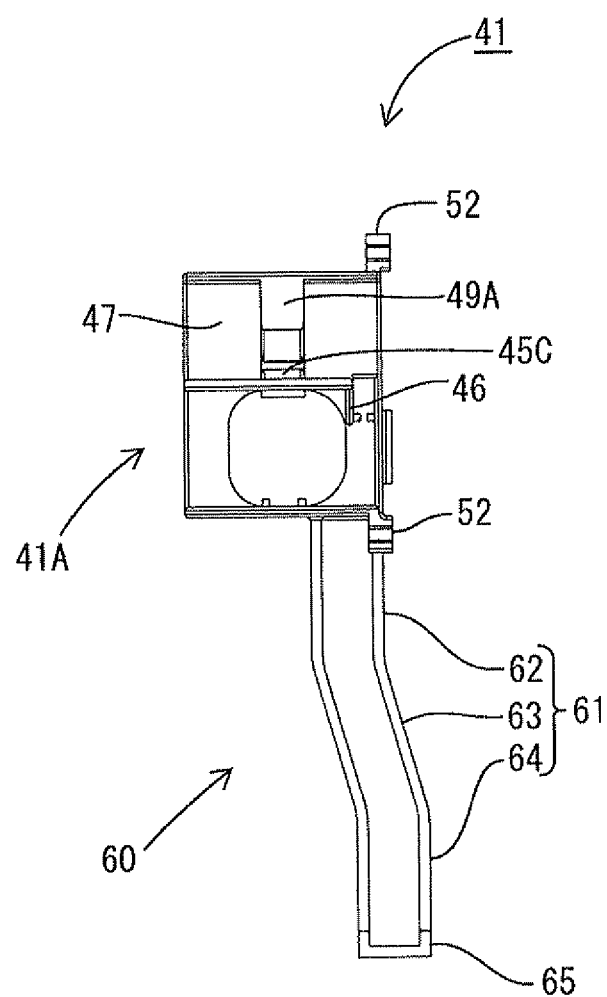
FIG. 8 is a plan view of the positioning member coupled to the left end side of the coupling unit.
Figure 9:
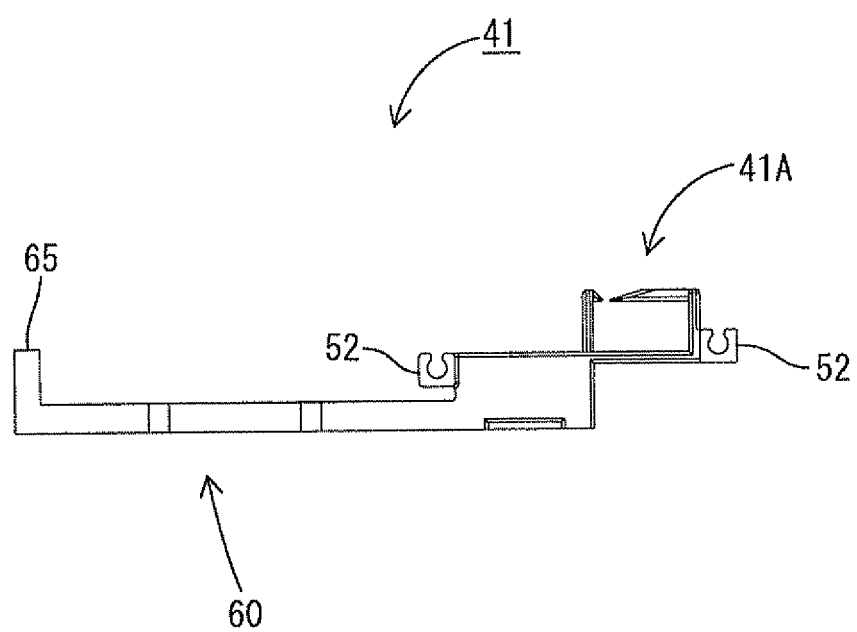
FIG. 9 is a side view of the positioning member coupled to the left end side of the coupling unit.
Figure 10:
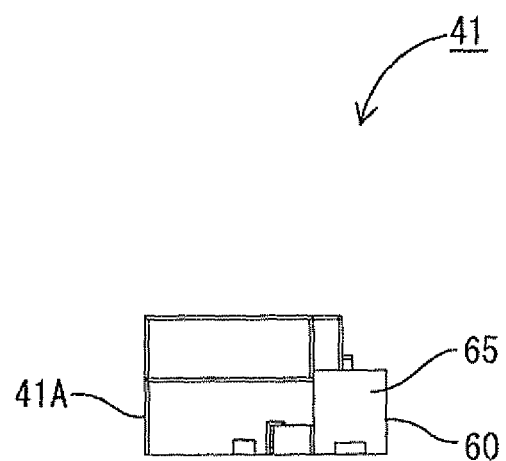
FIG. 10 is a front view of the positioning member coupled to the left end side of the coupling unit.

The ditch portion 47 is defined by: a dividing wall portion 45A; a bottom plate 48 extending to the front of the dividing wall portion 45A at the height of the wall portion 45 other than the dividing wall portion 45A; and a side wall portion 49 rising from the front edge of the bottom plate 48. As shown in FIG. 8, an electric-wire retaining claw 49A projects rearward from the top end of the side wall portion 49 while a retaining projection portion 45C projects forward from the top end of the dividing wall portion 45A. A space having a dimension sufficient to insert the voltage detecting line W is formed between the electric-wire retaining claw 49A and the retaining projection portion 45C, and the voltage detecting line W is inserted through this space to be retained within the ditch portion 47. When individual units 20A are coupled in the right and left direction, this ditch portion 47 is linked to the ditch portion 30 of an adjacent unit 20A.

The extended locking portion 60 has a U-shaped section where the top surface side defines a recessed portion. The extended locking portion 60 has an extended body portion 61 extending toward the second coupling unit 22, and an engaging projection part 65 rising perpendicularly from the distal end of the extended body portion 61. The extended body portion 61 has a bottom surface extending along (and flush with) the bottom surface of the divided body portion 41A. The extended body portion 61 includes: an extended proximal portion 62 linearly extending rearward; an inclined portion 63 inclined rightward (toward one side in the right and left direction) from the extended proximal portion 62 in accordance with the position of the locked portion 55 of an individual unit 20A to be connected; and an extended distal portion 64 again linearly extending rearward from the distal end of the inclined portion 63.

The engaging projection part 65 is continued from the distal end of the extended distal portion 64, and has a projection height such that the distal end slightly penetrates the engaging hole 56 when inserted through the engaging hole 56 of the locked portion 55.

Engaged portions 52 are provided at the front and rear ends of the right end side (at one side of the aligned direction) of the divided body portion 41A respectively, and both are engaged with the engaging portions 51 of an adjacent unit 20A. The engaged portion 52 of the first divided member 41 has a configuration identical with the engaged portion 52 of the individual unit 20A.

Figure 11:
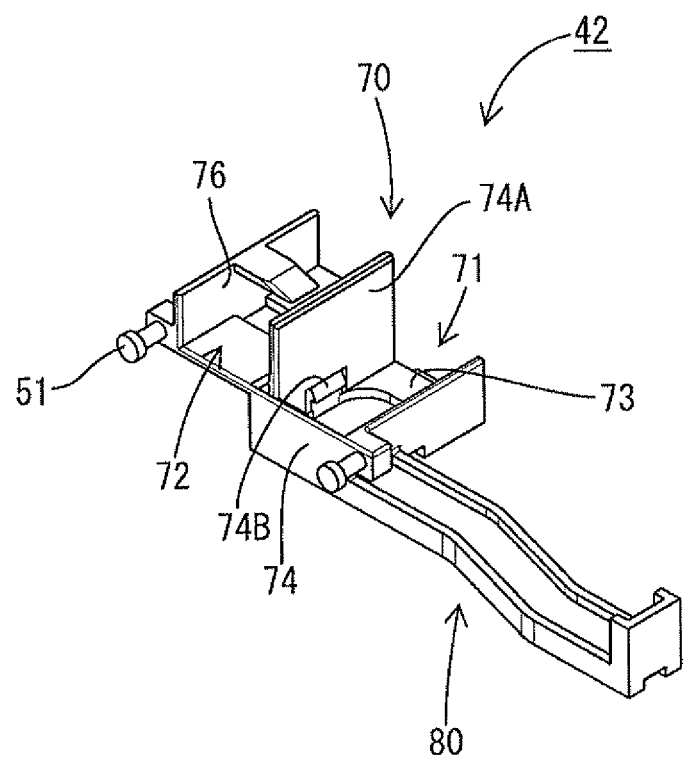
FIG. 11 is a perspective view of the positioning member coupled to the right end side of the coupling unit.

As shown in FIG. 11, the second divided member 42 is formed to be symmetrical with the first divided member 41. The second divided member 42 includes: a divided body portion 70 having a shape such that an individual unit 20A is divided by half; and an extended locking portion 80 integrally formed with the divided body portion 70 and extending rearward from the divided body portion 70 in an arm shape to be connected to the second coupling unit 22. The divided body portion 70 has a divided shape such that the right half of the individual unit 20A remains while the left half is cut out. The divided body portion 70 includes: an accommodating portion 71 accommodating a terminal portion 14; a ditch portion 72 in which the voltage detecting line W is routed; and an engaging portion 51 coupling the divided body portion 70 to the body portion 26 of an adjacent unit 20A. One divided body portion 70 is mounted on the top surface of one electric cell 10.

The accommodating portion 71 has a bottom portion 73, and a wall portion 74 rising from the edge of the bottom portion 73 other than the right end side. The bottom portion 73 has an opening substantially in its entirety, through which the electrode terminal 12B is inserted, and the bottom portion 73 is formed to include the edge of the opening. The wall portion 74 at the front side is a dividing wall portion 74A formed higher than others.

Figure 12:
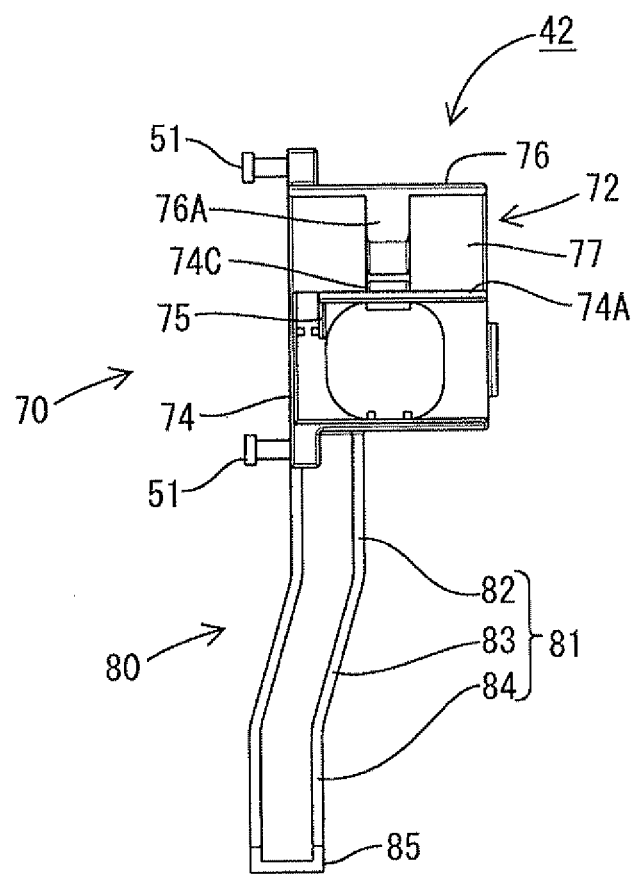
FIG. 12 is a plan view of the positioning member coupled to the right end side of the coupling unit.
Figure 13:
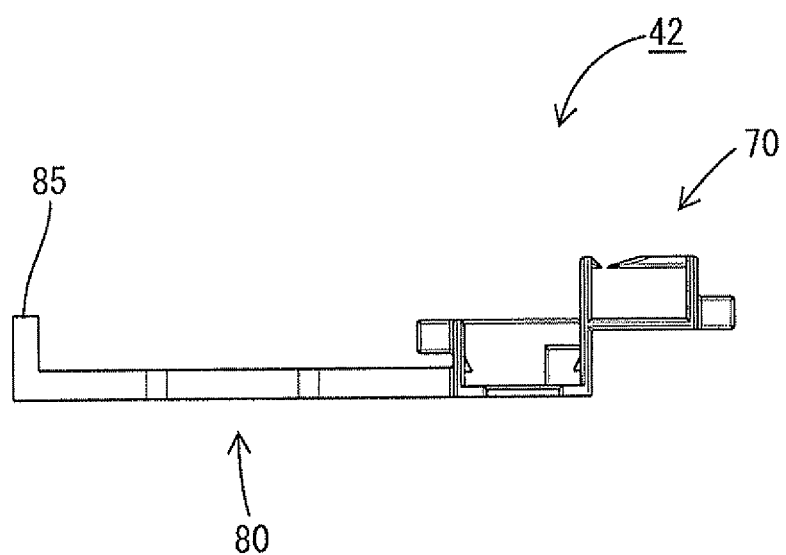
FIG. 13 is a side view of the positioning member coupled to the right end side of the coupling unit.
Figure 14:
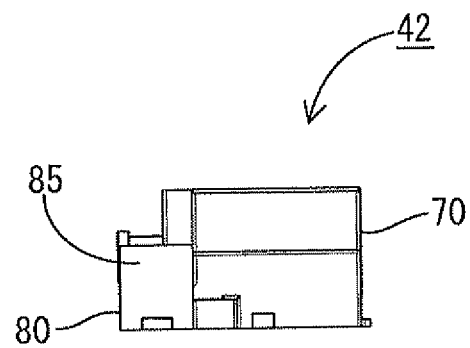
FIG. 14 is a front view of the positioning member coupled to the right end side of the coupling unit.

A locking claw 74B protrudes from the proximal portion of the dividing wall portion 74A so as to increase their sizes toward the lower side in an inclined manner. When the terminal portion 14 is mounted on the bottom portion 73, the top surface of the terminal portion 14 is locked to the locking claw 74B. As shown in FIG. 12, a partition wall 75 is provided at the inner side of the wall portion 74 of the right side, and the terminal portion 14 is accommodated at the right side of the partition wall 75 while the voltage detecting line W is routed at the left side of the partition wall 75. Since the positioning member 40 does not connect electrode terminals 12A and 12B (since only one electrode terminal 12B is inserted into the accommodating portion 71), it is not provided with any connecting member 13.

The ditch portion 72 is defined by: a dividing wall portion 74A; a bottom plate 77 extending to the front of the dividing wall portion 74A at the height of the wall portion 74 other than the dividing wall portion 74A; and a side wall portion 76 rising from the front edge of the bottom plate 77. An electric-wire retaining claw 76A protrudes rearward from the top end of the side wall portion 76 while a retaining projection portion 74C projects forward from the top end of the dividing wall portion 74A. A space sufficient to insert the voltage detecting line W is formed between the electric-wire retaining claw 76A and the retaining projection portion 74C, and the voltage detecting line W is inserted through this space to be retained within the ditch portion 72. When the second divided member 42 and the individual unit 20A are coupled in the right and left direction, the ditch portion 72 of the second divided member 42 and the ditch portion 30 of the individual unit 20A are arranged in line.

The extended locking portion 80 has a U section where the top surface defines a recessed portion. The extended locking portion 80 has an extended body portion 81 extending toward the second coupling unit 22, and an engaging projection part 85 vertically rising from the distal end of the extended body portion 81. The extended body portion 81 has a bottom surface extending along (and flush with) the bottom surface of the divided body portion 41A. The extended body portion 81 includes: an extended proximal portion 82 linearly extending rearward; an inclined portion 83 connected to the extended proximal portion 82 and inclined leftward (toward one side in the right and left direction) from the extended proximal portion 82 in accordance with the position of the locked portion 55; and an extended distal portion 84 again linearly extending rearward from the distal end of the inclined portion 83. The engaging projection part 85 is continued from the distal end of the extended distal portion 84, and has a projection height such that the distal end slightly penetrates the engaging hole 56 when inserted through the engaging hole 56 of the locked portion 55.

Engaging portions 51 are provided at the front and rear of the right end side (at one side of the aligned direction) of the divided body portion 70 respectively, and both are engaged with the engaged portions 52 of an adjacent individual unit 20A respectively. The engaged portion 51 of the second divided member 42 has a configuration identical with the engaged portion 51 of the individual unit 20A.

Figure 15:
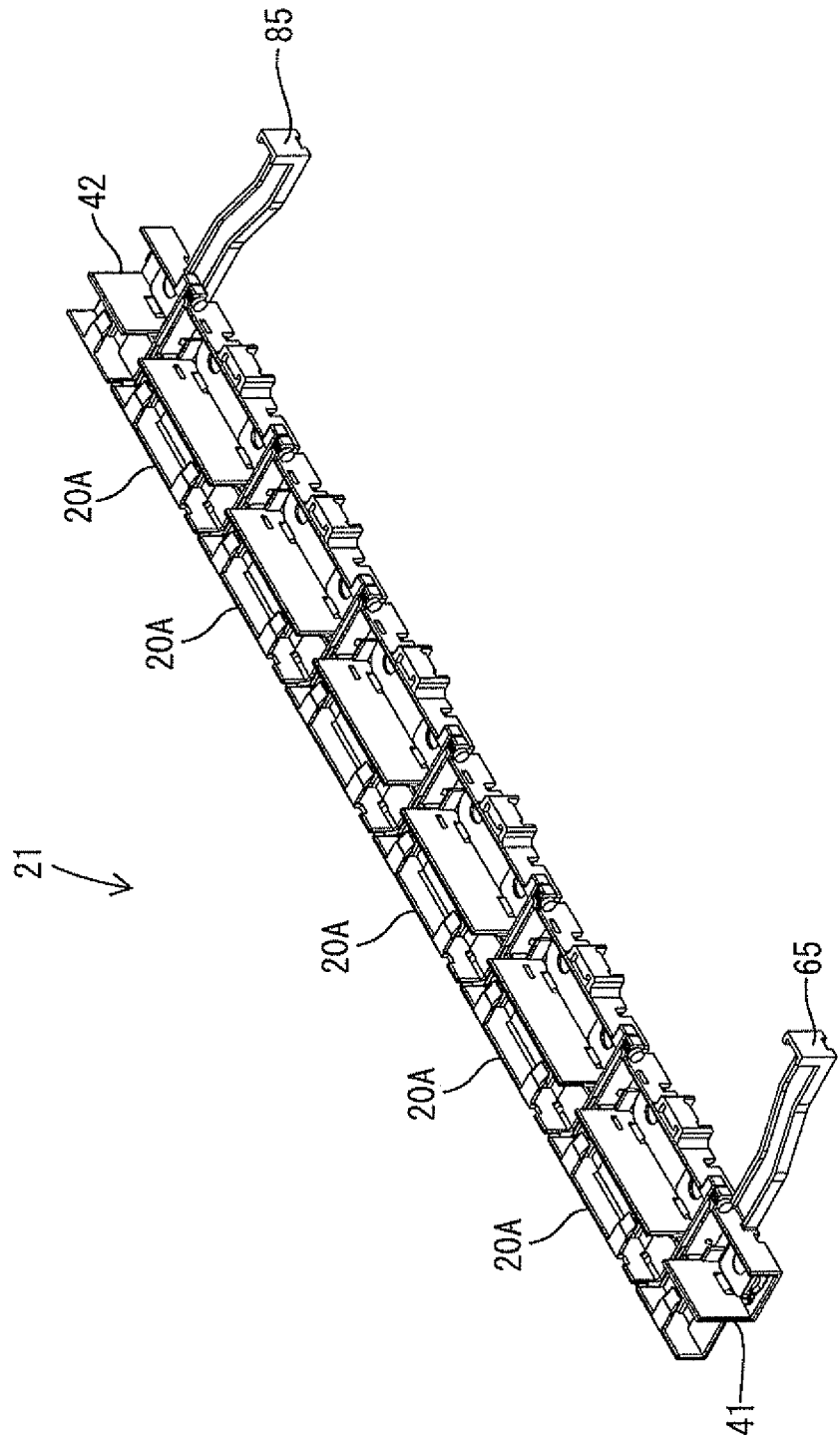
FIG. 15 illustrates a state where the positioning member is coupled to the coupling unit.

Next, a description will be made of assembly of the battery connecting assembly 20. The first coupling unit 21 including six (multiple) individual units 20A is formed by inserting the shaft portion 51B of the engaging portion 51 through the insertion recessed portion 53 of the engaged portion 52 to engage the engaging portion 51 with the engaged portion 52. The engaging portion 51 at one end side of the first coupling unit 21 is engaged with the engaged portion 52 of the first divided member 41 (positioning member) to be coupled, and the engaged portion 52 at the other end side of the first coupling unit 21 is engaged with the engaging portion 51 of the second divided member 42 (positioning member) to be coupled (FIG. 15).

Figure 16:
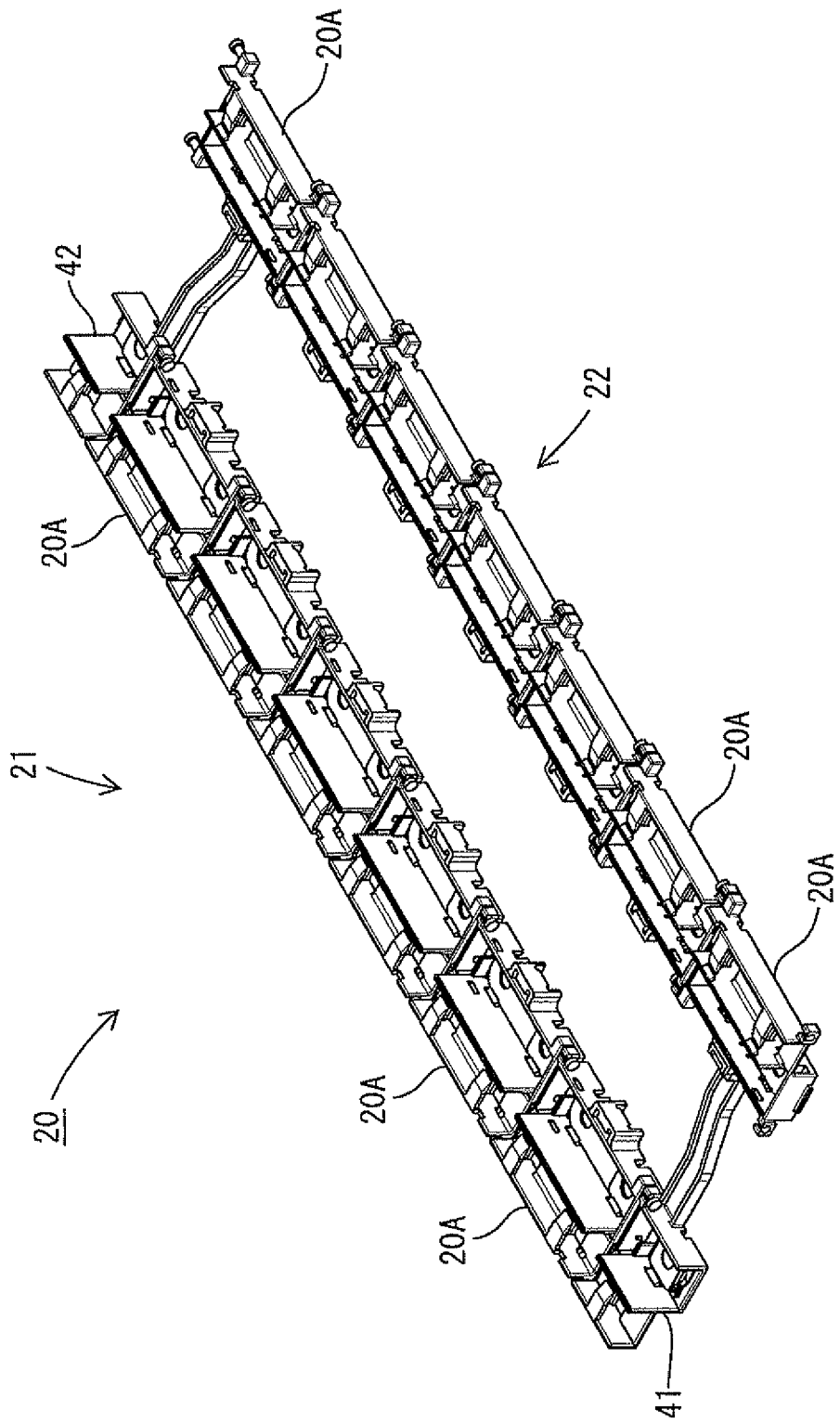
FIG. 16 is a perspective view of the battery connecting assembly.

In addition, similarly the second coupling unit 22 including seven (multiple) individual units 20A is formed by engaging the engaging portion 51 with the engaged portion 52. Next, the locking projection part 65 of the extended locking portion 60 in the first divided member 41 is inserted into the locking hole 56 of the locked portion 55 of the individual unit 20A at the left end in the second coupling unit 22, while the locking projection part 85 of the extended locking portion 80 in the second divided member 42 is inserted into the locking hole 56 of the locked portion 55 of the individual unit 20A at the right end in the second coupling unit 22. In this manner, the battery connecting assembly 20 is formed (FIG. 16).

Next, a description will be made of assembly of the battery module M. In the individual unit 20A, the connecting members 13 are accommodated in the accommodating portion 25, the cover of the terminal portion of the voltage detecting line W is peeled off in accordance with the number of units 20A to expose the tip ends of the core, the terminal portion 14 is crimped, and the terminal portion 14 is overlapped on the connecting member 13 to pass through the voltage detecting line W through the ditch portion 30 (FIG. 1). All the electrode terminals 12A and 12B of the plurality of aligned electric cells 10 (an electric cell group) are integrally inserted into all the terminal insertion holes of the connecting members 13 accommodated in the battery connecting assembly 20, and the terminal insertion holes of the terminal portions 14 overlapped on these connecting members 13 (FIG. 17). Then, nuts are screwed and fastened on electrode terminals 12A and 12B projecting from the terminal insertion holes of the terminal portions 14 and the connecting members 13. Once all of them are fastened, the battery module M is completed (FIG. 18).

According to the configuration of the above embodiment, the following effects are derived.

(1) According to the configuration of this embodiment, the battery connecting assembly 20 prevents a short circuit and the like due to, for example, a wrong assembly position of the second coupling unit 22 with respect to the first coupling unit 21 because the positioning member 40 is connected to both the first and second coupling units 21 and 22 to determine the relative positions of the first coupling unit 21 and the second coupling unit 22.

(2) In a configuration where the electric cells 10 are connected in series, in the ends of the group of electrode terminals, there are terminals not connected to any other electrode terminals 12A (12B). The connecting members 13 and the individual units 20A are omitted for these portions. However, in the present embodiment, a positioning member 40 can be provided in a space where no individual unit 20A is provided. In addition, as both sides of both coupling units 21 and 22 are positioned, it is possible to position the first coupling units 21 and the second coupling units 22 more stably.

Second Embodiment

Figure 22:
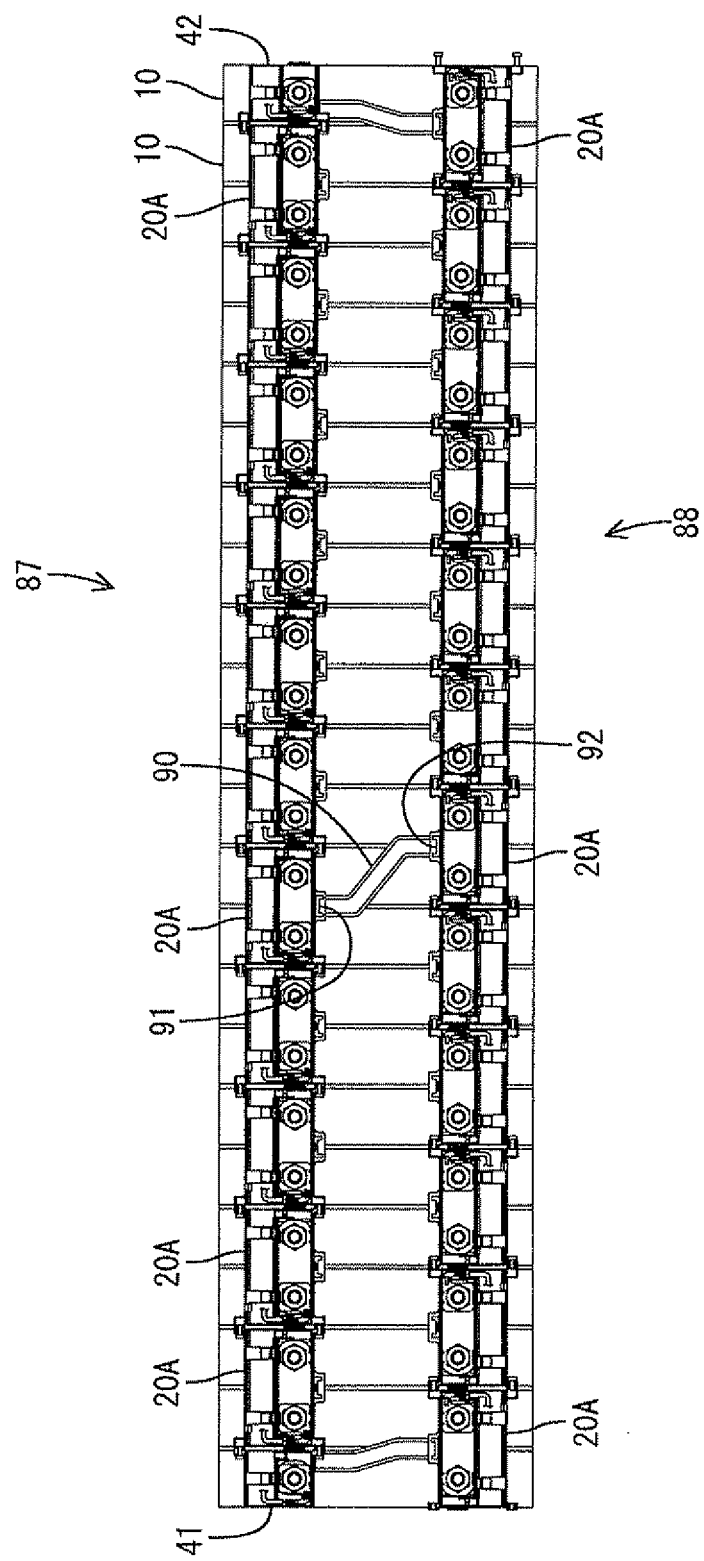
FIG. 22 is a plan view of a battery module.

A description will be made of a second embodiment with reference to FIGS. 19 to 22. In the first embodiment, both ends of the coupling units 21 and 22 are positioned by the positioning member 40, whereas in the second embodiment, as shown in FIG. 22, portions of the coupling units other than both ends are also positioned by a positioning member 90, which is different from the positioning member 40. Hereinafter, a description of the same structures as those of the first embodiment will be omitted using the same numerals.

Figure 19:
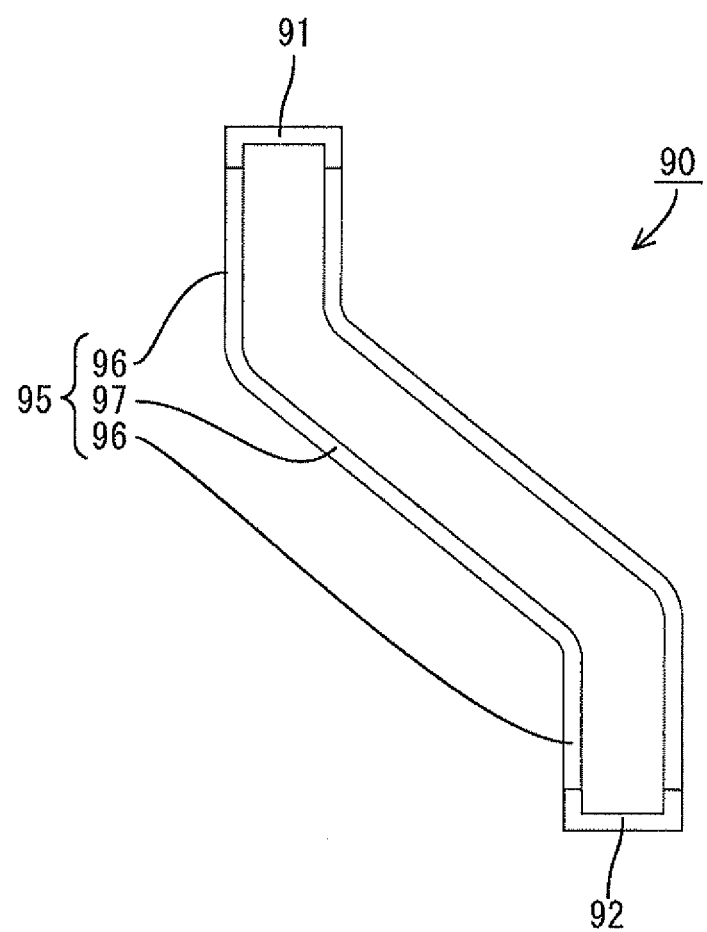
FIG. 19 is a plan view of a positioning member according to a second embodiment.
Figure 20:
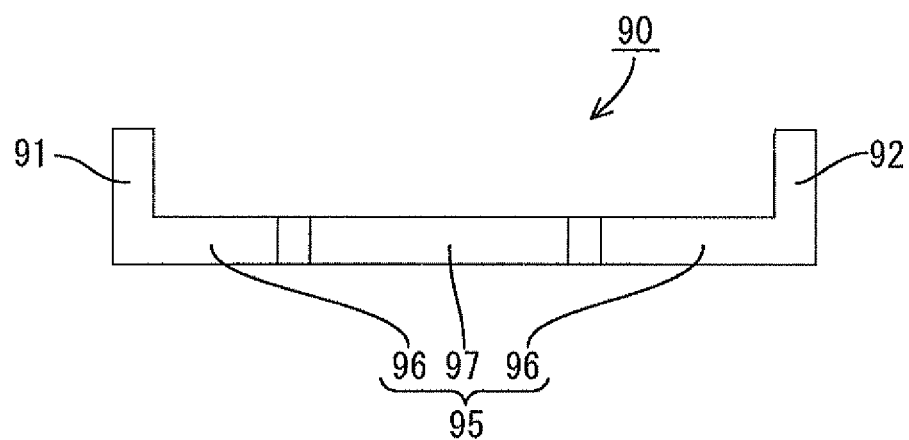
FIG. 20 is a side view of the positioning member.
Figure 21:
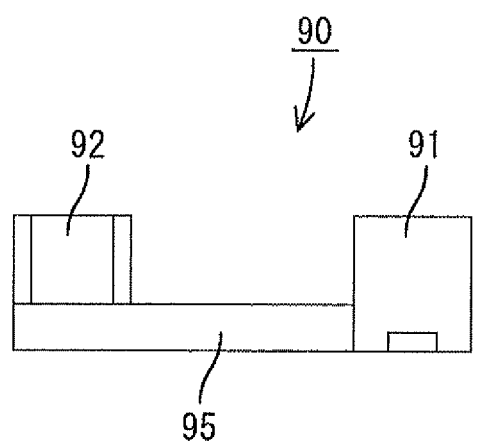
FIG. 21 is a front view of the positioning member.

The number of individual units 20A, which constitutes the electric cells 10, the first coupling unit 87 and the second coupling unit 88, is larger than that of the first embodiment (for example, the number of electric cells 10 is 24). The positioning member 90 has a sectional U shape having a recessed portion. As shown in FIG. 19, the positioning member 90 includes: an extended body portion 95 extending in a substantially crank shape in the front and rear direction; a first locking portion 91 locked to the locked portion 55 of an individual unit 20A included in the first coupling unit 87 at one end side of the extended body portion 95; and an second locking portion 92 locked to the locked portion 55 of the individual unit 20A included in the second coupling unit 88 at the other end side of the extended body portion 95.

The extended body portion 95 has a sectional U shape having a recessed portion on the upper surface. The extended body portion 95 has extended proximal portions 96 and 96 linearly extending, and an inclined portion 97 coupling these extended proximal portions 92. The inclined portion 97 is inclined at an angle and distance such that one of the extended base portions 96 and 96 is arranged at a position corresponding to the locked portion 55 of the individual unit 20A included in the first coupling unit 87, while the other of the extended proximal portions 96 and 96 is arranged at a position corresponding to the locked portion 55 of the individual unit 20A include in the second coupling unit 88.

The first locking portion 91 vertically rises from one end side of the extended body portion 95, and the second locking portion 92 vertically rises from the other end side of the extended body portion 95. Then, the positioning member 90 couples both the coupling units 87 and 88 to be locked between the locked portions 55 of individual units 20A placed in the substantially middle part of the first coupling unit 87 and the second coupling unit 88.

Thus, according to the configuration of the second embodiment, as the positioning member 90 includes the first locking portion 91 locked to the locked portion 55 of the individual unit 20A included in the first coupling unit 87, and the second locking portion 92 locked to the locked portion 55 of the individual unit 20A included in the second coupling unit 88, it is possible to position the first coupling unit 87 and the second coupling unit 88 with a simple configuration. In addition, as it is possible to add the positioning member 90 as needed, even when, for example, the number of units 20A included in each coupling unit becomes large, the first coupling unit 87 and the second coupling unit 88 can be stably positioned by adding the positioning member 90.

Other Embodiments

The present invention is not limited to the embodiments described above and in the drawings. The following embodiments, for example, may be included in the technical scope of the present invention.

(1) In the above embodiment, although the connecting member 13 connects heteropolar electrode terminals 12A and 12B (connecting electric cells 10 in series), the present invention is not limited to this and may include the connecting member that connects the homopolar electrode terminals 12A and 12B (connecting electric cells 10 in parallel). For example, the battery module M of the above embodiment may be further connected to another electric cell 10 in parallel, and the homopolar electrode terminals 12A and 12B may be connected with a plurality of connecting members 13 (battery connecting assembly 20).

(2) In the above embodiment, the individual units 20A are attached to the battery module M after they are coupled to each other. However, the battery connecting assembly 20 may be attached to the battery module M by repeatedly conducting the work of coupling the engaging portions 51 and the engaged portions 52 when the individual units 20A are attached to the electrode terminals 12A and 12B.

(3) The number of electric cells 10 (the number of electric cells to be connected) included in the battery module M is not limited to the number in the above embodiment. Accordingly, the numbers of individual units 20A, first coupling units 21 (87) and second coupling units 22 (88) attached to the battery module M are not limited to the aforementioned number, but it may be a battery connecting assembly having the number of units in accordance with the number of electric cells 10.

(4) In the first embodiment, the positioning member 40 is locked to the individual unit 20A at the end of the second coupling unit 22. However, the present invention is not limited to this, but the positioning member 40 is locked to the individual unit 20A other than the one at the end of the second coupling unit 22.

(5) The second embodiment has the positioning member 90 in addition to the positioning member 40. However, the present invention is not limited to this, but it may be an electric cell assembly only having the positioning member 90 without having the positioning member 40. In addition, although it has been described that the positioning member 90 couples the middle parts of the coupling units 87 and 88, it may couple other parts than the middle parts. Furthermore, although it has been described that the positioning member 90 couples engaged portions 55, which are close to each other in the right and left direction, it may couple engaged portions 55, which are far from each other in the right and left direction.

The disclosed technique is a battery connecting assembly accommodating a plurality of connecting members connecting electrode terminals adjacent to each other in an electrode terminal group of each line in a battery module, in which a plurality of electric cells each having a positive electrode terminal and a negative electrode terminal is aligned to form the plurality of electrode terminal groups of the plurality of lines, including: a first coupling unit having a plurality of individual units each accommodating the connecting member, and configured by coupling the individual units adjacent to each other; a second coupling unit having a plurality of individual units each accommodating the connecting member, and configured by coupling the individual units adjacent to each other, and arranged side by side with the first coupling unit; and a positioning member connected to the first coupling unit and the second coupling unit to position the first coupling unit and the second coupling unit relatively (first means).

According to the configuration of the first means, the battery connecting assembly prevents a short circuit and the like due to, for example, a wrong assembly position of the second coupling unit with respect to the first coupling unit because the positions of the first coupling unit and the second coupling unit are defined by the positioning member.

In addition to the configuration of the first means, the positioning member may be aligned at an end of the first coupling unit, and include an engaging portion engaging the positioning member to the first coupling unit, and an extended locking portion extending to the second coupling unit and locking the positioning member to an locked portion of the individual unit (second means).

In a case that the electric cells are connected in series, in the ends of the group of electrode terminals, there are terminals not connected to any other electrode terminals. The connecting members and individual units are omitted for these positions. However, according to the first means, a positioning member can be provided in a space where no individual unit is provided. In addition, as both sides of both coupling units and are positioned, it is possible to position the first coupling units the second coupling units more stably.

In addition to the configurations of the first and second means, the positioning member may include a first locking portion locked to a locked portion of the individual unit included in the first coupling unit, and a second locking portion locked to a locked portion of the individual unit included in the second coupling unit (third means).

According to the configuration of the third means, it is possible to position the first coupling unit and the second coupling unit with a simple configuration. In addition, as it is possible to add a positioning member as needed, even when, for example, the number of units included in each coupling unit becomes large, the first coupling unit and the second coupling unit can be stably positioned by adding the positioning member.

The invention claimed is:

1. A battery connecting assembly comprising:
a plurality of connecting members connecting electrode terminals adjacent to each other in each of a plurality of lines of electrode terminals in a battery module, the battery module including a plurality of electric cells, each having a positive electrode terminal and a negative electrode terminal aligned to form the plurality of lines of electrode terminals;
a first coupling unit having a first plurality of individual units, each of the first plurality of individual units accommodating one of the connecting members, the first coupling unit being configured by coupling the first plurality of individual units adjacent to each other;
a second coupling unit having a second plurality of individual units, each of the second plurality of individual units accommodating one of the connecting members, the second coupling unit being configured by coupling the second plurality of individual units adjacent to each other, the second coupling unit being spaced apart from the first coupling unit and extending parallel to the first coupling unit; and
at least one positioning member that engages with the first coupling unit and with the second coupling unit, the at least one positioning member positioning the first coupling unit and the second coupling unit relatively to one another.

2. The battery connecting assembly according to claim 1, wherein the at least one positioning member comprises (i) an engaging portion that engages the at least one positioning member to the first coupling unit, and (ii) an extended locking portion that extends to the second coupling unit, and engages the at least one positioning member to a locked portion of one of the second plurality of individual units, the at least one positioning member being aligned with at least one end of the first coupling unit.

3. The battery connecting assembly according to claim 1, wherein the at least one positioning member comprises (i) a first locking portion that engages with and locks to a locked portion of one of the first plurality of individual units, and (ii)

a second locking portion that engages with and locks to a locked portion of one of the second plurality of individual units.

4. The battery connecting assembly according to claim 2, wherein the extended locking portion has a sectional U-shape with a top surface that defines a recessed portion, and the extended locking portion extends in a direction perpendicular to the first coupling unit and the second coupling unit.

5. The battery connecting assembly according to claim 3, wherein the at least one positioning member further comprises an extended body portion that extends from the first coupling unit to the second coupling unit in a direction perpendicular to the first coupling unit and the second coupling unit, the extended body portion having a sectional U-shape with a top surface that defines a recessed portion.

6. The battery connecting assembly according to claim 5, wherein the first locking portion is located at a first end of the extended body portion, and the second locking portion is located at a second end of the extended body portion.

7. The battery connecting assembly according to claim 1, wherein the at least one positioning member includes a first positioning member and a second positioning member.

\* \* \* \* \*